US009075888B2

(12) United States Patent
Yoshida

(10) Patent No.: US 9,075,888 B2
(45) Date of Patent: Jul. 7, 2015

(54) INFORMATION PROCESSING APPARATUS

(75) Inventor: Taketoshi Yoshida, Kunitachi (JP)

(73) Assignee: FUJITSU LIMITED, Kawasaki (JP)

( * ) Notice: Subject to any disclaimer, the term of this patent is extended or adjusted under 35 U.S.C. 154(b) by 417 days.

(21) Appl. No.: 13/489,727

(22) Filed: Jun. 6, 2012

(65) Prior Publication Data

US 2013/0042243 A1 Feb. 14, 2013

(30) Foreign Application Priority Data

Aug. 11, 2011 (JP) ................................ 2011-175703

(51) Int. Cl.
 *G06F 11/30* (2006.01)
(52) U.S. Cl.
 CPC .................. *G06F 11/3089* (2013.01)
(58) Field of Classification Search
 None
 See application file for complete search history.

(56) References Cited

U.S. PATENT DOCUMENTS

2004/0205414 A1* 10/2004 Roselli et al. .................... 714/39
2010/0299455 A1* 11/2010 Master et al. ................. 709/248

FOREIGN PATENT DOCUMENTS

| JP | 11-243389 | 9/1999 |
| JP | 2001-67334 | 3/2001 |
| JP | 2006-139649 | 6/2006 |

OTHER PUBLICATIONS

Matsumoto et al. Distributed Monitoring Control System and Recording Medium in Which software for Distributed Monitoring Control is Recorded, Mar. 16, 2001, JP #2001-067334, 70 pages (translated).*
Okamoto et al., Method and Device for Monitoring Network, Sep. 7, 1999, JP #11-243389, 4 pages (translated).*

* cited by examiner

*Primary Examiner* — Emerson Puente
*Assistant Examiner* — Zhi Chen
(74) *Attorney, Agent, or Firm* — Staas & Halsey LLP

(57) ABSTRACT

A procedure includes: receiving a request to monitor a target monitored item of the computer from a first information processing apparatus; inquiring the first information processing apparatus for a first monitoring condition; and determining a second information processing apparatus by referring to monitoring information. The monitoring information includes information indicating a specific monitored item and a monitoring condition for monitoring the specific monitored item in association with an identifier for identifying an information processing apparatus. The procedure further includes: instructing one of the first and second information processing apparatuses to monitor the target monitored item of the computer in accordance with the first monitoring condition for monitoring the target monitored item by the other one of the first and second information processing apparatuses; and instructing the other one of the first and second information processing apparatuses not to transmit a request to monitor the target monitored item.

10 Claims, 12 Drawing Sheets

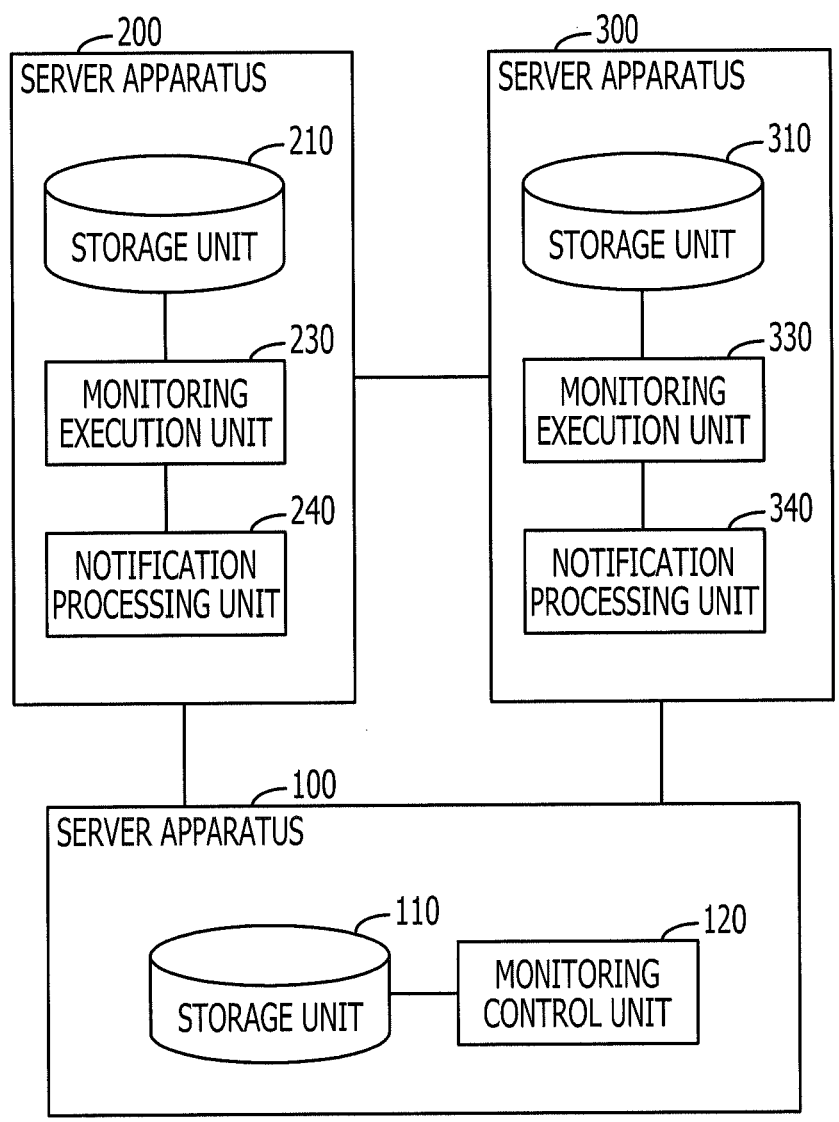

| ACCESS RECORDING TABLE ||||
|---|---|---|---|
| ACCESS ID | MONITORING ITEM | MONITORING CONDITION | NOTIFICATION CONDITION |
| 192.168.0.2 | ALIVE MONITORING | MONITORING CYCLE : 10(msec) | REPLY DELAY IS WITHIN 10 (msec): NORMAL OTHER CASES: ABNORMAL |

| ACCESS RECORDING TABLE ||||
|---|---|---|---|
| ACCESS ID | MONITORING ITEM | MONITORING CONDITION | NOTIFICATION CONDITION |
| 192.168.0.2 | ALIVE MONITORING | MONITORING CYCLE : 10(msec) | REPLY DELAY IS WITHIN 10 (msec): NORMAL OTHER CASES: ABNORMAL |
| 192.168.0.3 | ALIVE MONITORING | MONITORING CYCLE : 20(msec) | REPLY DELAY IS WITHIN 20 (msec): NORMAL OTHER CASES: ABNORMAL |

| ACCESS RECORDING TABLE ||||
|---|---|---|---|
| ACCESS ID | MONITORING ITEM | MONITORING CONDITION | NOTIFICATION CONDITION |
| 192.168.0.3 | ALIVE MONITORING | MONITORING CYCLE : 20(msec) | REPLY DELAY IS WITHIN 20 (msec): NORMAL OTHER CASES: ABNORMAL |

INFORMATION PROCESSING APPARATUS

CROSS-REFERENCE TO RELATED APPLICATION

This application is based upon and claims the benefit of priority of the prior Japanese Patent Application No. 2011-175703, filed on Aug. 11, 2011, the entire contents of which are incorporated herein by reference.

FIELD

The embodiments discussed herein are related to an information processing apparatus.

BACKGROUND

Up to now, various information processing systems are utilized. In the information processing system, an operational management for a stable operation is carried out. For example, an apparatus that performs the operational management monitors operating states of apparatuses and programs included in the information processing system. Through the monitoring, an abnormality location may be found in an early stage and dealt with.

In the information processing system, methods for easily managing monitored targets are proposed. For example, a method is proposed in which a client module provides a monitor module with a monitored item, a monitoring interval, a monitoring instruction, and the like, and the monitor module monitors a module as a managed target on the basis of the above-mentioned instruction and the like to easily cope with an addition of the monitored target and the like.

In addition, for example, a method is proposed in which among function units configured to perform processes related to the monitoring and the control, a predetermined representative function unit represents the other function units and performs transmission and reception of data with a delivery unit to alleviate a load on the delivery unit.

Furthermore, for example, a method is proposed in which a monitored machine transmits a port number assigned to a monitored agent on the monitored machine to a monitoring machine upon an activation of the monitored agent so that the monitoring machine may deal with the change of the port number of the monitored machine. The monitoring machine updates a correspondence relationship between the monitored agent and the port number on the basis of the received port number and monitors the monitored machine.

Japanese Laid-open Patent Publication No. 11-243389, Japanese Laid-open Patent Publication No. 2001-67334, and Japanese Laid-open Patent Publication No. 2006-139649 disclose related techniques.

SUMMARY

According to an aspect of the present invention, provided is a computer-readable recording medium storing a program that causes a computer to execute a procedure. The procedure includes: receiving a request to monitor a target monitored item of the computer from a first information processing apparatus; inquiring the first information processing apparatus for a first monitoring condition; and determining a second information processing apparatus by referring to monitoring information stored in a storage. The second information processing apparatus monitors the target monitored item of the computer. The monitoring information includes information indicating a specific monitored item and a monitoring condition for monitoring the specific monitored item in association with an identifier for identifying an information processing apparatus monitoring the specific monitored item. The procedure further includes: instructing one of the first and second information processing apparatuses to monitor the target monitored item of the computer in accordance with the first monitoring condition for monitoring the target monitored item by the other one of the first and second information processing apparatuses; and instructing the other one of the first and second information processing apparatuses not to transmit a request to monitor the target monitored item.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a block diagram illustrating functions of a server apparatus according to a second embodiment;

FIG. 5A, FIG. 5B, and FIG. 5C illustrate data structure examples of an access record table;

DESCRIPTION OF EMBODIMENTS

Plural monitoring source apparatuses (monitoring side) may monitor the same item of one monitoring destination apparatus (monitored side). For example, in a case where the respective monitoring source apparatuses have different purposes, the respective monitoring source apparatuses may separately obtain a result of monitoring the same item from the monitoring destination apparatus. Also, for example, respective applications on the respective monitoring source apparatuses may separately obtain, for processing of the respective applications, a result of monitoring the same item from the monitoring destination apparatus.

However, when the same item on the single monitoring destination apparatus is redundantly monitored, a problem may occur that the efficiency is unsatisfactory. For example, requests regarding the monitoring are transmitted to the monitoring destination apparatus in clusters over a certain period of time, and loads on a network or the monitoring destination apparatus may be increased.

Hereinafter, embodiments will be described with reference to the drawings.

First Embodiment

Figure 1:
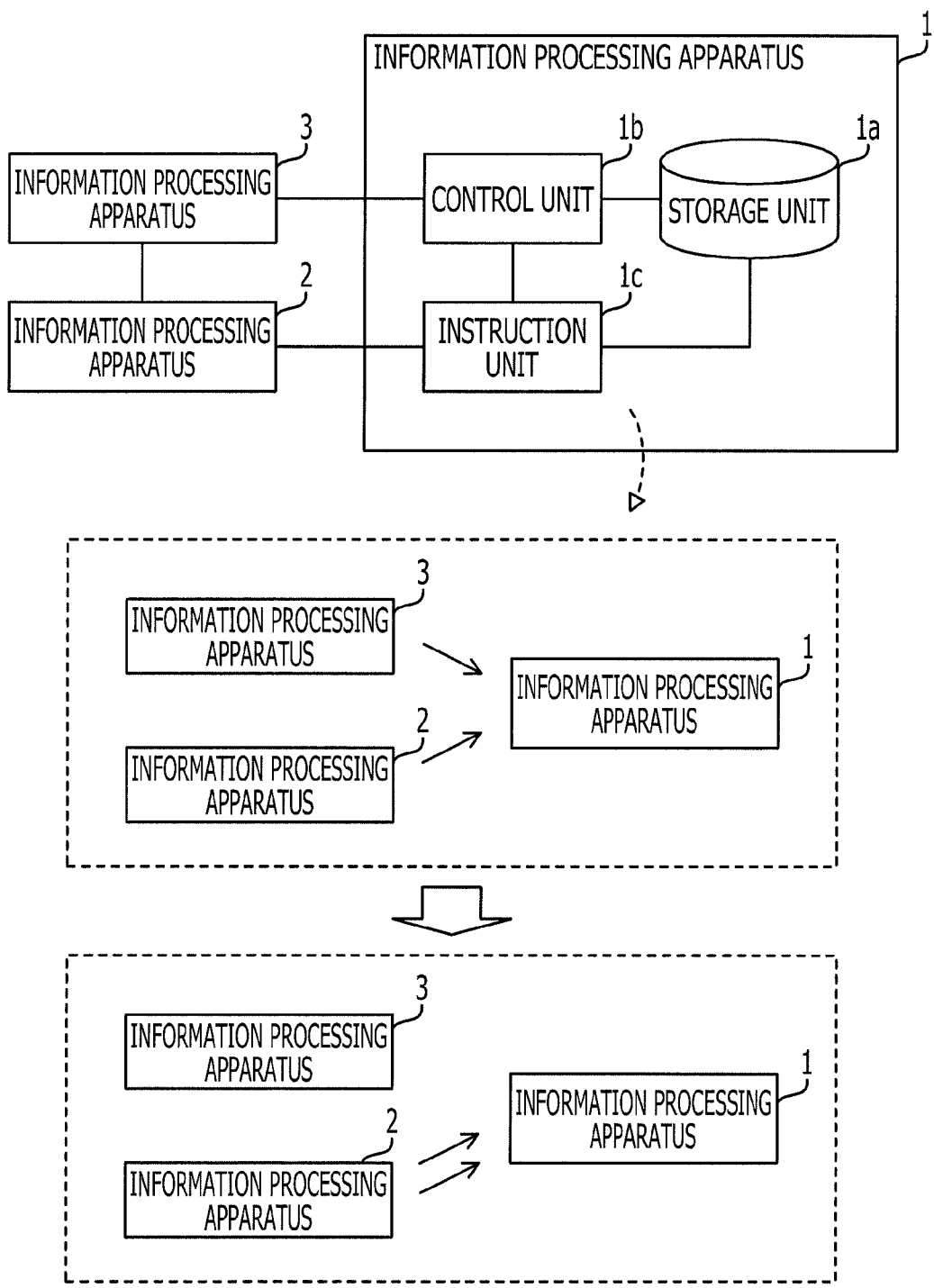
FIG. 1 illustrates an information processing system according to a first embodiment.

FIG. 1 illustrates an information processing system according to a first embodiment. In this information processing system, information processing apparatuses 1, 2, and 3 are mutually connected so as to be communicable via a network. The information processing apparatuses 2 and 3 monitor the information processing apparatus 1. For example, the information processing apparatuses 2 and 3 perform an alive monitoring on a predetermined function of the information processing apparatus 1, a monitoring on an operation and a state of a predetermined device or program on the information processing apparatus 1, and the like. The information processing apparatus 1 includes a storage unit 1a, a control unit 1b, and an instruction unit 1c.

The storage unit 1a stores a monitored item monitored by an information processing apparatus and a condition (hereinafter, which may be referred to as monitoring condition) for carrying out the monitoring, while being associated with an identifier of the information processing apparatus.

The identifier of the information processing apparatus is information for uniquely identifying the respective information processing apparatuses in the information processing system. For example, the identifier of the information processing apparatus is an IP (Internet Protocol) address. The identifier of the information processing apparatus may also be an identifier assigned to the information processing apparatus by a predetermined program, for example, an OS (Operating System) program or an application program.

The monitored item is an item to be monitored. For example, items that may be monitored include an alive monitoring on a predetermined function, a state monitoring on a predetermined device, and the like. For example, an alive monitoring on a communication function may be conducted through the ICMP (Internet Control Message Protocol). Also, for example, a state monitoring on a device may be conducted through SNMP (Simple Network Management Protocol).

The storage unit 1a may be mounted as an RAM (Random Access Memory) or an HDD (Hard Disk Drive).

When a request (hereinafter, which may be referred to as monitoring request) to monitor the monitored item is received from the information processing apparatus 3, the control unit 1b inquires the information processing apparatus 3 for a monitoring condition with regard to the relevant item. The control unit 1b refers to the storage unit is to check whether the information processing apparatus 2 exists, which performs the monitoring on the same item of the information processing apparatus 1 as the relevant item.

In a case where the information processing apparatus 2 exists, the instruction unit 1c instructs one information processing apparatus among the information processing apparatuses 2 and 3 to perform the monitoring on the relevant item under the monitoring condition with regard to the relevant item monitored by the information processing apparatus other than the one information processing apparatus. For example, the instruction unit 1c instructs the information processing apparatus 2 to perform the monitoring on the relevant item under the condition of the monitoring performed by the information processing apparatus 3. At this time, the instruction unit is may select one of the information processing apparatuses on the basis of indices indicating performances, capabilities, and the like of the information processing apparatuses 2 and 3 to perform the above-mentioned instruction. For example, the instruction unit 1c may select the information processing apparatus having a shorter reply time.

Also, the instruction unit 1c instructs the information processing apparatus other than the one information processing apparatus not to transmit the monitoring request of the relevant item. For example, in a case where the monitoring instruction is carried out with respect to the information processing apparatus 2, the instruction unit 1c instructs the information processing apparatus 3 not to transmit the monitoring request of the relevant item.

Herein, the control unit 1b and the instruction unit 1c may be implemented by a CPU (Central Processing Unit) which executes a program stored in an RAM.

According to the information processing apparatus 1, when a request to monitor the monitored item is received from the information processing apparatus 3 by the control unit 1b, the information processing apparatus 3 is inquired for the condition for carrying out the monitoring on the relevant item and also the storage unit 1a is referred to. Then, it is checked whether the information processing apparatus 2 exists, which performs the monitoring on the same item of the information processing apparatus 1 as the relevant item. In a case where the information processing apparatus 2 exists, one information processing apparatus among the information processing apparatuses 2 and 3 is instructed by the instruction unit 1c to perform the monitoring on the relevant item under the condition for carrying out the monitoring on the relevant item by the information processing apparatus other than the one information processing apparatus, and also the information processing apparatus other than the one information processing apparatus is instructed not to transmit the monitoring request of the relevant item.

With this configuration, the monitoring may be efficiently carried out. To be specific, when the information processing apparatuses 2 and 3 that perform the monitoring on the same item with respect to the information processing apparatus 1 exist, the information processing apparatus 1 asks the information processing apparatus 2 to substitute the monitoring work of the information processing apparatus 3 so that the monitoring sources on the relevant item may be aggregated to the information processing apparatus 2. When the monitoring sources are aggregated, the information processing apparatus 1 may avoid responding to the monitoring request from the information processing apparatus 3. In addition, by instructing the information processing apparatus 3 not to transmit the monitoring request, the excess transmission of the monitoring requests may be suppressed. Thus, it is possible to alleviate the loads on the network and the information processing apparatus 1 as the monitoring destination.

At this time, when a selection is made on which one of the information processing apparatuses 2 and 3 the monitoring sources are aggregated to on the basis of the indices such as the performances related to the information processing apparatuses 2 and 3, it becomes possible to easily select the monitoring source apparatus that may perform the monitoring at a higher speed.

Second Embodiment

Figure 2:
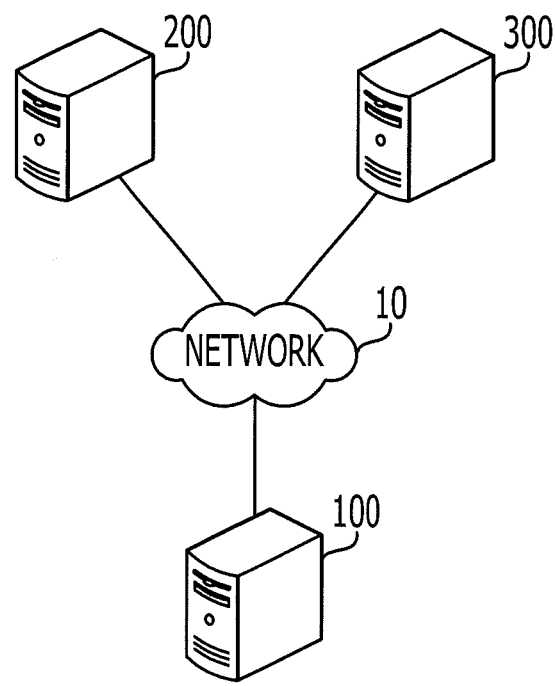
FIG. 2 illustrates an information processing system according to a second embodiment.

FIG. 2 illustrates an information processing system according to a second embodiment. This information processing system includes server apparatuses 100, 200, and 300. The server apparatuses 100, 200, and 300 are mutually connected so as to be able to perform a data communication via a network 10. The server apparatuses 100, 200, and 300 are information processing apparatuses provided with a function of providing a predetermined service.

The server apparatus 100 executes a program of a business application.

The server apparatuses 200 and 300 monitor operating states of devices on the server apparatus 100, execution states of the OSs and the application programs, and the like. The server apparatuses 200 and 300 monitor the same item on the server apparatus 100.

Herein, the server apparatus 100 is the monitoring destination apparatus monitored by the server apparatuses 200 and 300. The server apparatuses 200 and 300 are the monitoring source apparatuses that monitor the server apparatus 100.

Figure 3:
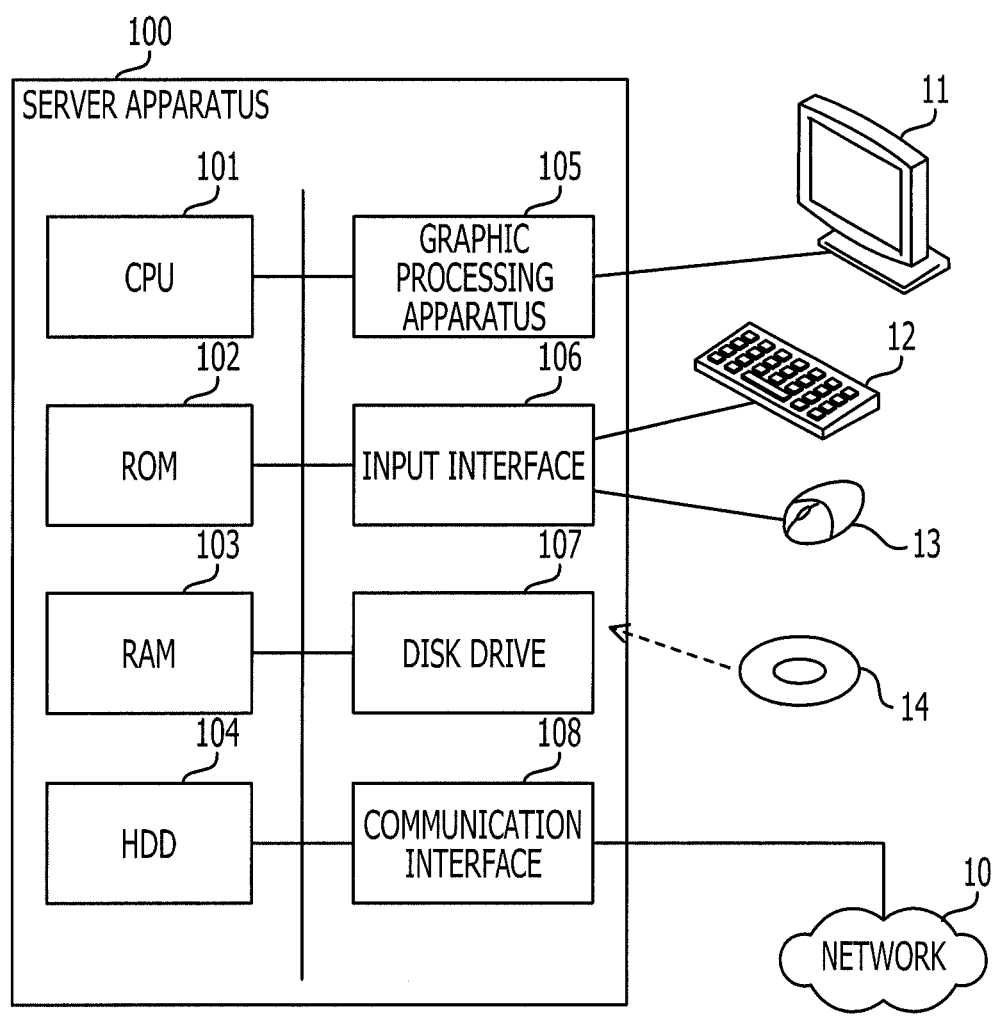
FIG. 3 illustrates a hardware example of a server apparatus.

FIG. 3 illustrates a hardware example of a server apparatus. The server apparatus 100 has a CPU 101, a ROM (Read Only Memory) 102, a RAM 103, an HDD 104, a graphic processing device 105, an input interface 106, a disk drive 107, and the communication interface 108.

The CPU 101 executes an OS program and application programs to control the entirety of the server apparatus 100.

The ROM 102 stores a predetermined program such as a BIOS (Basic Input/Output System) program that is executed at the time of the activation of the server apparatus 100. The ROM 102 may be substituted by a rewritable non-volatile memory.

The RAM 103 temporarily stores at least a part of the OS program and the application programs executed by the CPU 101. In addition, the RAM 103 temporarily stores at least a part of data used in a process by the CPU 101.

The HDD 104 stores the OS program and the application programs. In addition, the HDD 104 stores data used in the process by the CPU 101. It is noted that instead of the HDD 104 (or in combination with the HDD 104), another non-volatile storage apparatus such as an SSD (Solid State Drive) may also be used.

The graphic processing device 105 is connected to a display monitor 11. The graphic processing device 105 displays an image on the display monitor 11 in accordance with a command from the CPU 101.

The input interface 106 is connected to an input device such as a key board 12 or a mouse 13. The input interface 106 outputs an input signal sent from the input device to the CPU 101.

The disk drive 107 is a reading device configured to read data stored on a recording medium 14. In the recording medium 14, for example, the programs executed by the server apparatus 100 are stored. The server apparatus 100 may realize functions which will be described below, for example, by executing the programs recorded on the recording medium 14. That is, the above-mentioned programs may be distributed while being recorded on the computer-readable recording medium 14.

For the recording medium 14, for example, a magnetic recording device, an optical disk, an opto-magnetic recording medium, or a semiconductor memory may be used. The magnetic recording device includes an HDD, a flexible disc (FD), a magnetic tape, and the like. The optical disk includes a CD (Compact Disc), a CD-R (Recordable)/RW (ReWritable), a DVD (Digital Versatile Disc), a DVD-R/RW/RAM, and the like. The opto-magnetic recording medium includes an MO (Magneto-Optical disk) and the like. The semiconductor memory includes a flash memory such as a USB (Universal Serial Bus) memory.

The communication interface 108 is connected to the network 10. The communication interface 108 may perform a data communication with the server apparatuses 200 and 300 over the network 10.

It is noted that the server apparatuses 200 and 300 may also be realized by hardware configurations similar to the server apparatus 100.

FIG. 4 is a block diagram illustrating functions of the server apparatus according to the second embodiment. The server apparatus 100 has a storage unit 110 and a monitoring control unit 120. Functions of components of the server apparatus 100 may be realized on the server apparatus 100, for example, while the CPU 101 executes a predetermined program. All or a part of the functions of the components of the server apparatus 100 may also be mounted through dedicated hardware.

The storage unit 110 stores an access recording table. The access recording table is data for managing the monitoring source apparatuses with respect to one monitoring destination apparatus. In the access recording table, an identifier (for example, an IP address) of each monitoring source apparatus, the monitored item, the monitoring condition, and the like are set. The access recording table is provided for each monitoring destination apparatus. According to the second embodiment, the server apparatus 100 exists as the monitoring destination apparatus. For this reason, the storage unit 110 stores the access recording table for managing the monitoring source apparatuses that monitor the server apparatus 100. The information such as the identifier, the monitored item, the monitoring condition, and the like set in the access recording table may be hereinafter referred to as monitoring information.

The monitoring control unit 120 receives monitoring requests from the server apparatuses 200 and 300. The monitoring control unit 120 refers to the access recording table stored in the storage unit 110 and checks whether or not another server apparatus that monitors the same item of the server apparatus 100 as the item related to the relevant monitoring request. In a case where the other server apparatus that monitors the same item exists, jobs of the monitoring on the relevant item are aggregated to one of the server apparatuses.

For example, when the monitoring request is received from the server apparatus 300, in a case where the server apparatus 200 that monitors the same item as the item related to the relevant monitoring request exists, the monitoring control unit 120 requests the server apparatus 200 to substitute the monitoring on the relevant item under a condition for the server apparatus 300. The request of the monitoring substitution includes the monitoring information regarding the monitoring on the relevant item by the server apparatus 300.

When the request destination of the monitoring substitution is determined, the monitoring control unit 120 selects the request destination on the basis of indices of the performances or the capabilities of the server apparatuses 200 and 300 (for example, a reply time for the communication). The monitoring control unit 120 instructs the server apparatus, which is not requested to substitute the monitoring, to stop the transmission of the monitoring request. The monitoring control unit 120 includes the functions of the control unit 1b and the instruction unit is described in the first embodiment.

The server apparatus 200 includes a storage unit 210, a monitoring execution unit 230, and a notification processing unit 240. The functions of the components of the server apparatus 200 are realized on the server apparatus 200, for example, while a CPU provided to the server apparatus 200 executes predetermined programs. All or a part of the functions of the components of the server apparatus 200 may also be mounted through dedicated hardware.

The storage unit 210 stores an access recording table. The access recording table is data for managing the monitoring source apparatuses with respect to one monitoring destination apparatus as described above. The access recording table is provided for each monitoring destination apparatus. According to the second embodiment, the server apparatus 100 exists as the monitoring destination apparatus. For this reason, the storage unit 210 stores the access recording table for managing the monitoring source apparatuses that monitor the server apparatus 100.

For example, in the access recording table, predetermined monitoring information input by an administrator to the server apparatus 200 is previously set. The server apparatus 200 may display a GUI (Graphical User Interface) for accepting the above-mentioned operation input on a display monitor connected to the server apparatus 200 (or a display monitor connected to the other information processing apparatus). For example, the administrator operates an input device connected to the server apparatus 200 (or the other information processing apparatus) while following the GUI and may input the desired monitoring information to the server apparatus 200.

The monitoring execution unit 230 refers to the monitoring information on the access recording table stored in the storage unit 210 to determine a schedule for the monitoring and monitors the server apparatus 100. To be specific, when a condition for monitoring the relevant item is established with regard to the monitored item included in the monitoring information, the monitoring execution unit 230 transmits the monitoring request to the server apparatus 100. In the server apparatus 100, an observation of the relevant item is carried out by the monitoring control unit 120 in accordance with the above-mentioned request. Subsequently, the monitoring execution unit 230 receives from the server apparatus 100 information (hereinafter, which will be referred to as monitoring result) obtained from the observation. The monitoring execution unit 230 checks whether or not an abnormality of the server apparatus 100 exists on the basis of the monitoring result. When the abnormality is detected, the monitoring execution unit 230 executes a predetermined process (hereinafter, which may be referred to as abnormality-time process) for dealing with the above-mentioned abnormality. Alternatively, another processing unit may be requested to execute the abnormality-time process.

The monitoring execution unit 230 may be requested from the monitoring control unit 120 to execute the monitoring substitution on the relevant item for the server apparatus 300 in some cases. At this time, the monitoring execution unit 230 receives the monitoring information of the server apparatus 300 together with the request and records the received monitoring information in the access recording table. The monitoring execution unit 230 determines a schedule for the monitoring on the basis of the monitoring information recorded in the access recording table and monitors the relevant item. The monitoring execution unit 230 determines the schedule on the basis of the monitoring condition of the server apparatus 200 and the monitoring condition of the server apparatus 300.

When the monitoring execution unit 230 is instructed from the monitoring control unit 120 to stop the transmission of the monitoring request with respect to a certain item, the transmission of the monitoring request with respect to the relevant item is stopped. In this case, the monitoring execution unit 230 detects the abnormality of the server apparatus 100 on the basis of the monitoring result on the relevant item obtained from the server apparatus 300.

When the monitoring execution unit 230 substitutes the monitoring for the server apparatus 300, the notification processing unit 240 notifies the server apparatus 300 of the monitoring result. Meanwhile, when the server apparatus 300 substitutes the monitoring for the server apparatus 200, the notification processing unit 240 receives the monitoring result related to the relevant item from the server apparatus 300. In that case, the notification processing unit 240 outputs the monitoring result to the monitoring execution unit 230.

The server apparatus 300 includes a storage unit 310, a monitoring execution unit 330, and a notification processing unit 340. The functions of the components of the server apparatus 300 are realized on the server apparatus 300, for example, while a CPU provided to the server apparatus 300 executes predetermined programs. It is noted however that all or a part of the functions of the components of the server apparatus 300 may also be mounted through dedicated hardware.

The storage unit 310, the monitoring execution unit 330, and the notification processing unit 340 respectively realize the functions similar to the storage unit 210, the monitoring execution unit 230, and the notification processing unit 240. It is noted however that one of the server apparatuses 200 and 300 may substitute the monitoring for the other. In that case, although the server apparatus on the substituting side and the server apparatus on the substituted side include components having the same functions, but processes to be executed are different from each other.

For example, in a case where the substituting side is the server apparatus 200 and the substituted side is the server apparatus 300, the following configuration is set.

The monitoring execution unit 230 substitutes the monitoring for the monitoring execution unit 330. When the monitoring execution unit 230 substitutes the monitoring for the monitoring execution unit 330, the notification processing unit 240 transmits the monitoring result to the notification processing unit 340.

The notification processing unit 340 outputs the monitoring result received from the notification processing unit 240 to the monitoring execution unit 330. The monitoring execution unit 330 detects the abnormality of the server apparatus 100 on the basis of the monitoring result obtained via the notification processing unit 340.

In a case where the substituting side is the server apparatus 300 and the substituted side is the server apparatus 200, the roles of the monitoring execution units 230 and 330 may be switched with one another, and the roles of the notification processing units 240 and 340 may be switched with one another.

Hereinafter, a case will be supposed in which the substituting side is the server apparatus 200 and the substituted side is the server apparatus 300. Next, access recording tables stored in the storage units 110, 210, and 310 will be described.

FIG. 5A, FIG. 5B, and FIG. 5C illustrate data structure examples of an access record table. FIG. 5A illustrates an access recording table 111. The access recording table 111 is stored in the storage unit 110. FIG. 5B illustrates an access recording table 211. The access recording table 211 is stored in the storage unit 210. FIG. 5C illustrates an access recording table 311. The access recording table 311 is stored in the storage unit 310. The access recording tables 111, 211, and 311 are provided for each monitoring destination apparatus. The access recording tables 111, 211, and 311 are exemplary tables in a case where the server apparatus 100 is the monitoring destination apparatus. In a case where another server apparatus exists as the monitoring destination apparatus, the access recording tables corresponding to the other server apparatus are stored in the storage units 110, 210, and 310.

Herein, data structures of the access recording tables 111, 211, and 311 are identical to each other. Hereinafter, the data structure of the access recording table 111 will be described, but the same applies to the access recording tables 211 and 311.

In the access recording table 111, fields of an access ID (IDentifier), a monitored item, a monitoring condition, and a notification condition are provided. The pieces of information of the respective fields disposed in a lateral direction are mutually associated with each other to represent information of a single monitoring source apparatus.

In the field of the access ID, identifier for identifying the monitoring source apparatus is set. The identifier is, for example, an IP address. Herein, an IP address of the server apparatus 100 is assumed to be "192.168.0.1". An IP address of the server apparatus 200 is assumed to be "192.168.0.2". An IP address of the server apparatus 300 is assumed to be "192.168.0.3".

In the field of the monitored item, the item to be monitored is set. In the field of the monitoring condition, information indicating a timing at which the monitoring on the relevant item is executed is set. In the field of the notification condition, a condition for determining whether the monitoring result in the monitoring destination apparatus is normal or abnormal is set.

For example, in the access recording table 111, the following information is set in which the access ID is "192.168.0.2", the monitored item is the "alive monitoring", the monitoring condition is a "monitoring cycle: 10 (msec (milliseconds))", and the notification condition is a "reply delay is within 10 (msec): normal, and other cases: abnormal".

This information indicates that the server apparatus 200 (IP address "192.168.0.2") exists as the monitoring source apparatus with respect to the server apparatus 100. This information indicates that the monitored item monitored by the server apparatus 200 is the "alive monitoring" (herein, the alive monitoring on the communication function is assumed). The alive monitoring on the communication function may be carried out, for example, through the execution of the ping command (the transmission of the ICMP echo request and the reception of the ICMP echo reply). In addition, this information indicates that the timing at which the monitoring on the relevant item is executed is a cycle at every 10 msec. Furthermore, this information indicates that when the reply delay of the echo reply with respect to the echo request is within 10 msec, it is regarded as normal, and when the reply delay falls into the other cases (longer than 10 msec), it is regarded as abnormal.

In the access recording table 111, information on the server apparatus 200 that is the monitoring source apparatus is set. The server apparatus 100 that is the monitoring destination apparatus manages the information on the server apparatus 200 that performs the "alive monitoring" with respect to the server apparatus 100.

In the access recording table 211, pieces of information on the server apparatuses 200 and 300 that are the monitoring source apparatuses are set. The server apparatus 200 also manages the monitoring information of the server apparatus 300 and thus substitutes the monitoring for the server apparatus 300.

In the access recording table 311, the information on the server apparatus 300 that is the monitoring source apparatus is set. Since the monitoring result is obtained from the server apparatus 200, the server apparatus 300 manages the default monitoring information (regarding the server apparatus 300).

It is noted that so long as the server apparatus may uniquely be identified, identifier other than the IP address may be used for the access ID. For example, predetermined pieces of identifier on the respective server apparatuses which are assigned by executing the OS program or a predetermined application program may be used for the access ID.

In the access recording tables 111, 211, and 311, the alive monitoring is exemplified as the monitored item, but other items may be monitored. For example, a use state of a system resource such as a utilization ratio of the CPU or the disc, a use state of a network such as network traffic, an operating state of a service etc. of a predetermined application, a message of a system log, and the like may be set as the monitored item. Items other than the above-mentioned items may also be monitored. These items may be monitored, for example, by the SNMP. To be specific, the monitoring execution unit 230 functions as an SNMP manager and requests the server apparatus 100 for an observation result related to the relevant monitored item. The monitoring control unit 120 functions as an SNMP agent and replies an observation result in accordance with the relevant request to the monitoring execution unit 230. In addition, in the item of the notification condition, in accordance with the monitored item, conditions may be set in which the abnormality occurs in the following cases including a case where the utilization ratio of the CPU or the like exceeds a threshold ratio, a case where a predetermined service is stopped, and a case where a predetermined message is output to the system log.

Next, a description will be given of a procedure of the information processing system having the above-mentioned configuration.

Figure 6:
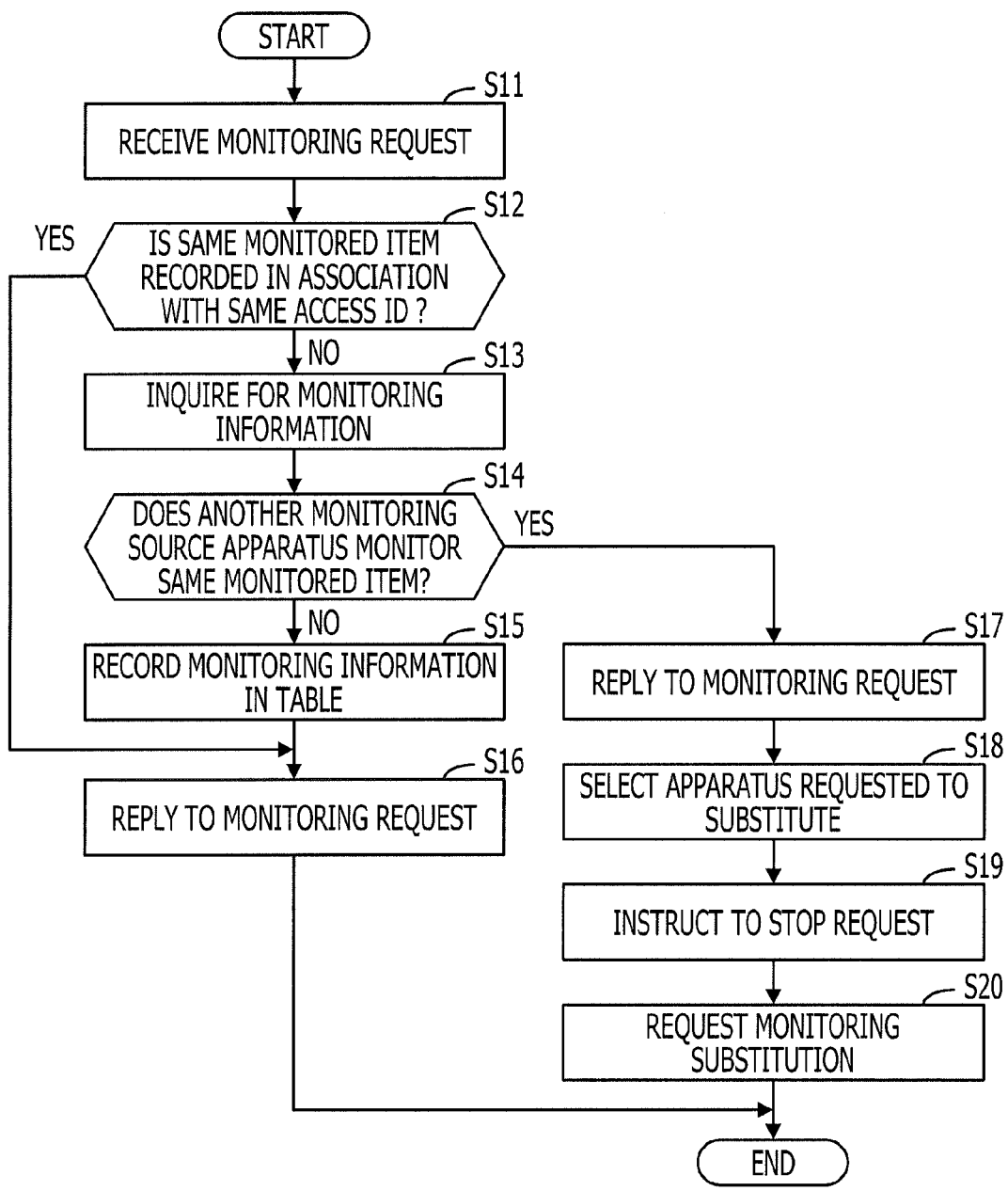
FIG. 6 is a flow chart of a process of a monitoring destination apparatus.

FIG. 6 is a flow chart of a process of a monitoring destination apparatus. Hereinafter, a description will be given of the process illustrated in FIG. 6.

(In S11) The monitoring control unit 120 receives a monitoring request. The monitoring request includes information on an access ID of a monitoring source apparatus and a monitored item. For example, in the case of the alive monitoring for the communication, the ICMP echo request corresponds to the monitoring request.

(In S12) The monitoring control unit 120 refers to the access recording table 111 stored in the storage unit 110 and determines whether or not a monitored item that is the same as the monitored item included in the relevant monitoring request is already recorded while being associated with an access ID (IP address) that is the same as the access ID included in the relevant monitoring request. In a case where the monitored item is already recorded, the process advances to S16. In a case where the monitored item is not recorded, the process advances to S13.

(In S13) The monitoring control unit 120 inquires for monitoring information related to the relevant monitoring request to the monitoring source apparatus that has transmitted the monitoring request. The monitoring control unit 120 receives the monitoring information from the relevant monitoring source apparatus.

(In S14) The monitoring control unit 120 refers to the access recording table 111 and determines whether or not another monitoring source apparatus that monitors the same item as the monitored item requested in S11 exists. In a case where the other monitoring source apparatus exists, the process advances to S17. In a case where the other monitoring source apparatus does not exist, the process advances to S15.

(In S15) The monitoring control unit 120 records the monitoring information received in S13 in the access recording table 111.

(In S16) The monitoring control unit 120 replies a result with respect to the monitoring request received in S11. For example, in the case of the alive monitoring on the communication function, the ICMP echo reply corresponds to the reply of the relevant result. After that, the process is ended.

(In S17) The monitoring control unit 120 replies a result with respect to the monitoring request received in S11. To be specific, this is similar to S16.

(In S18) The monitoring control unit 120 selects a monitoring source apparatus to be requested the substitution of the monitoring. To be specific, the monitoring control unit 120 selects, as a substitution request destination, one having a shorter reply time for the communication among the monitoring source apparatus that performs the monitoring on the relevant item set in the access recording table 111 and the monitoring source apparatus that has transmitted the monitoring request received in S11. For example, the monitoring control unit 120 may compare the reply times for the communication by executing ping commands to the respective monitoring source apparatuses and obtaining the respective reply times.

(In S19) The monitoring control unit 120 instructs the monitoring source apparatus that is not set as the substitution request destination in S18 not to transmit the monitoring request with regard to the relevant monitored item.

(In S20) The monitoring control unit 120 requests the monitoring source apparatus selected as the substitution request destination in S17 for the monitoring substitution. At this time, the monitoring control unit 120 transmits the monitoring information of another monitoring source apparatus to the monitoring source apparatus as the substitution request destination.

In this manner, when the monitoring request is accepted, the server apparatus 100 detects another monitoring source apparatus that monitors the same item. The server apparatus 100 requests one of the plural monitoring source apparatuses that monitor the same item to substitute the monitoring for another monitoring source apparatuses. With this configuration, monitoring loads of the monitoring source apparatuses that monitor the same item are aggregated to the single monitoring source apparatus.

For example, by causing the server apparatus 200 to substitute the monitoring for the server apparatus 300, the monitoring loads of the monitoring source apparatuses that monitor the relevant item may be aggregated to the server apparatus 200.

It is noted that for example, in a case where the monitoring of the server apparatus 100 is carried out through the SNMP, the server apparatus 100 receives a request based on the SNMP as the monitoring request (in S11). The server apparatus 100 transmits, to the monitoring source apparatus, a reply based on the SNMP to the request (in S16).

Figure 7:
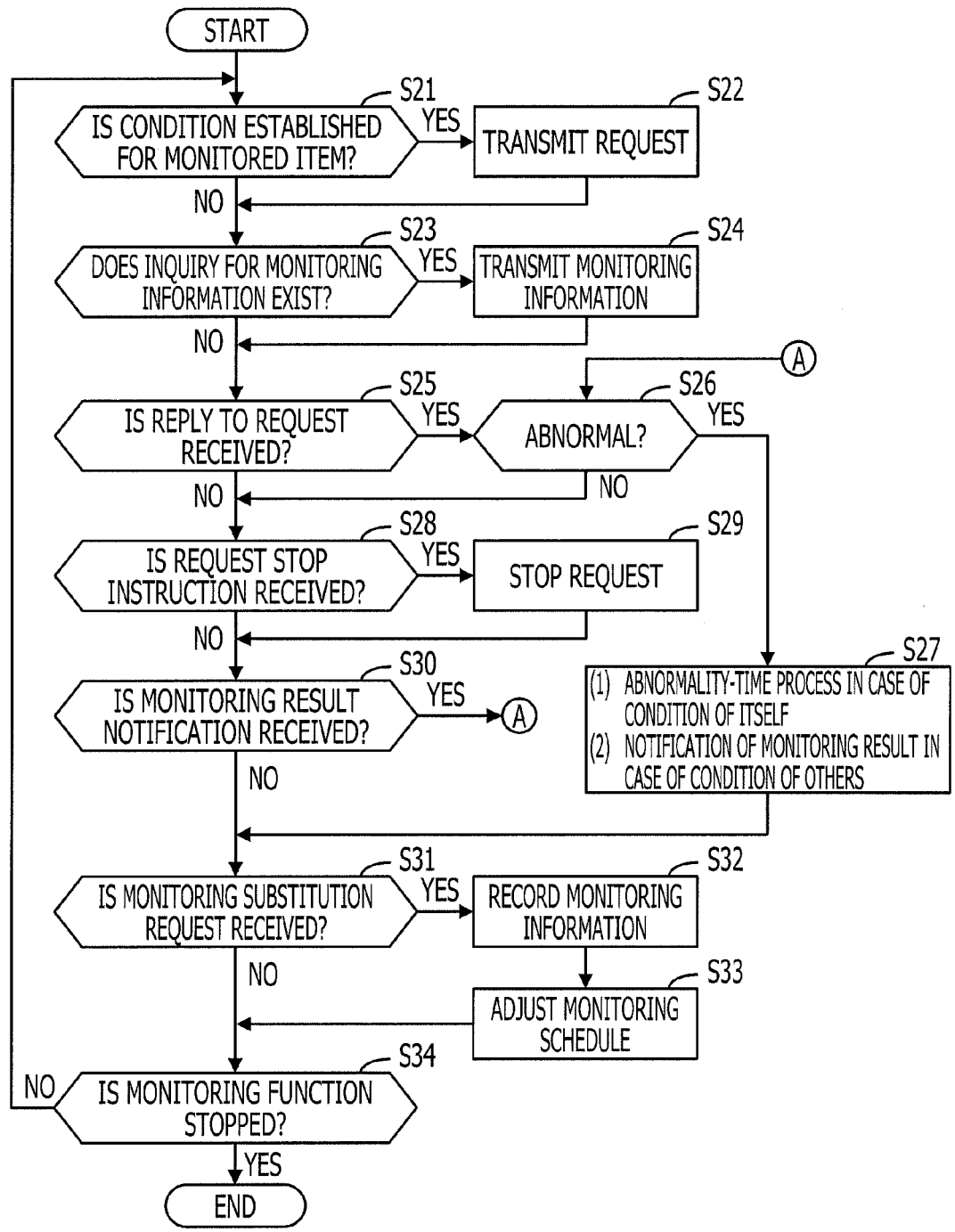
FIG. 7 is a flow chart of a process of a monitoring source apparatus.

FIG. 7 is a flow chart of a process of a monitoring source apparatus. Hereinafter, a description will be given of the process illustrated in FIG. 7. It is noted that hereinafter, the description will be given while the server apparatus 200 is exemplified, but the server apparatus 300 also adopts a similar procedure.

(In S21) The monitoring execution unit 230 refers to the access recording table 211 stored in the storage unit 210 and determines whether or not the monitoring condition is established for a currently monitored item. In a case where the monitoring condition is established, the process advances to S22. In a case where the monitoring condition is not established, the process advances to S23.

(In S22) The monitoring execution unit 230 refers to the access recording table 211 and transmits the monitoring request corresponding to the above-mentioned monitoring condition to the server apparatus 100 (monitoring destination apparatus).

(In S23) The monitoring execution unit 230 determines whether or not an inquiry for the monitoring information (including information for specifying the monitored item) is received from the server apparatus 100. In a case where the inquiry for the monitoring information is received, the process advances to S24. In a case where the inquiry for the monitoring information is not received, the process advances to S25.

(In S24) The monitoring execution unit 230 refers to the access recording table 211 in accordance with the inquiry for the monitoring information and transmits the monitoring information regarding the specified monitored item to the server apparatus 100.

(In S25) The monitoring execution unit 230 determines whether or not a reply (monitoring result) to the monitoring request is received from the server apparatus 100. In a case where the reply to the monitoring request is received, the process advances to S26. In a case where the reply to the monitoring request is not received, the process advances to S28.

(In S26) The monitoring execution unit 230 compares the notification condition set in the access recording table 211 with the monitoring result and determines whether or not an abnormality exists. In a case where the abnormality exists, the process advances to S27. In a case where the abnormality does not exists, the process advances to S28.

(In S27) In a case the monitoring request previously transmitted to the server apparatus 100 is transmitted by the monitoring condition of the server apparatus 200, the monitoring execution unit 230 executes a predetermined abnormality-time process. For example, it is conceivable that the monitoring execution unit 230 performs an abnormality notification to the administrator, the execution of a predetermined abnormality-time process, and the like. In a case where the monitoring request previously transmitted to the server apparatus 100 has transmitted under the monitoring condition of the other monitoring source apparatus (the server apparatus 300), the notification processing unit 240 obtains the monitoring result from the monitoring execution unit 230 to notify the relevant monitoring source apparatus (the server apparatus 300) of the monitoring result.

(In S28) The monitoring execution unit 230 determines whether or not an instruction to stop the monitoring request with respect to a certain item is received from the server apparatus 100. In a case where the instruction is received, the process advances to S29. In a case where the instruction is not received, the process advances to S30.

(In S29) The monitoring execution unit 230 stops transmission of the monitoring request with regard to the instructed item. In this case, it indicates that the other monitoring source apparatus (the server apparatus 300) is requested to substitute the monitoring on the relevant item. That is, after that, the notification of the monitoring result on the relevant item is conducted from the other monitoring source apparatus (the server apparatus 300).

(In S30) The monitoring execution unit 230 determines whether or not the notification of the monitoring result is received from the other monitoring source apparatus (the server apparatus 300). In a case where the notification of the monitoring result is received, the process advances to S26. In a case where the notification of the monitoring result is not received, the process advances to S31.

(In S31) The monitoring execution unit 230 determines whether or not the monitoring substitution request is received from the server apparatus 100. In a case where the monitoring substitution request is received, the process advances to S32. In a case where the monitoring substitution request is not received, the process advances to S34.

(In S32) The monitoring execution unit 230 records the monitoring information received together with the monitoring substitution request in the access recording table 211.

(In S33) The monitoring execution unit 230 refers to the access recording table 211 and adjusts the monitoring schedule on the basis of the monitoring condition of another monitoring source apparatus that monitors the same item. An adjustment method for the monitoring schedule will be described later.

(In S34) The monitoring execution unit 230 determines whether or not the monitoring function of itself is stopped. In a case where the monitoring function is stopped, the process is ended. In a case where the monitoring function is not stopped, the process advances to S21.

In this manner, the server apparatus 200 monitors the server apparatus 100. In the server apparatus 300, the monitoring execution unit 330 performs the process of the monitoring execution unit 230, and the notification processing unit 340 performs the process of the notification processing unit 240.

It is noted that the order of S13 and S14 may be reversed. That is, after the process in S14, the process in S13 may be executed immediately before S15 and S17.

Furthermore, the order of S19 and S20 may be reversed.

Next, a description will be given of a specific flow of the entire monitoring process.

Figure 8:
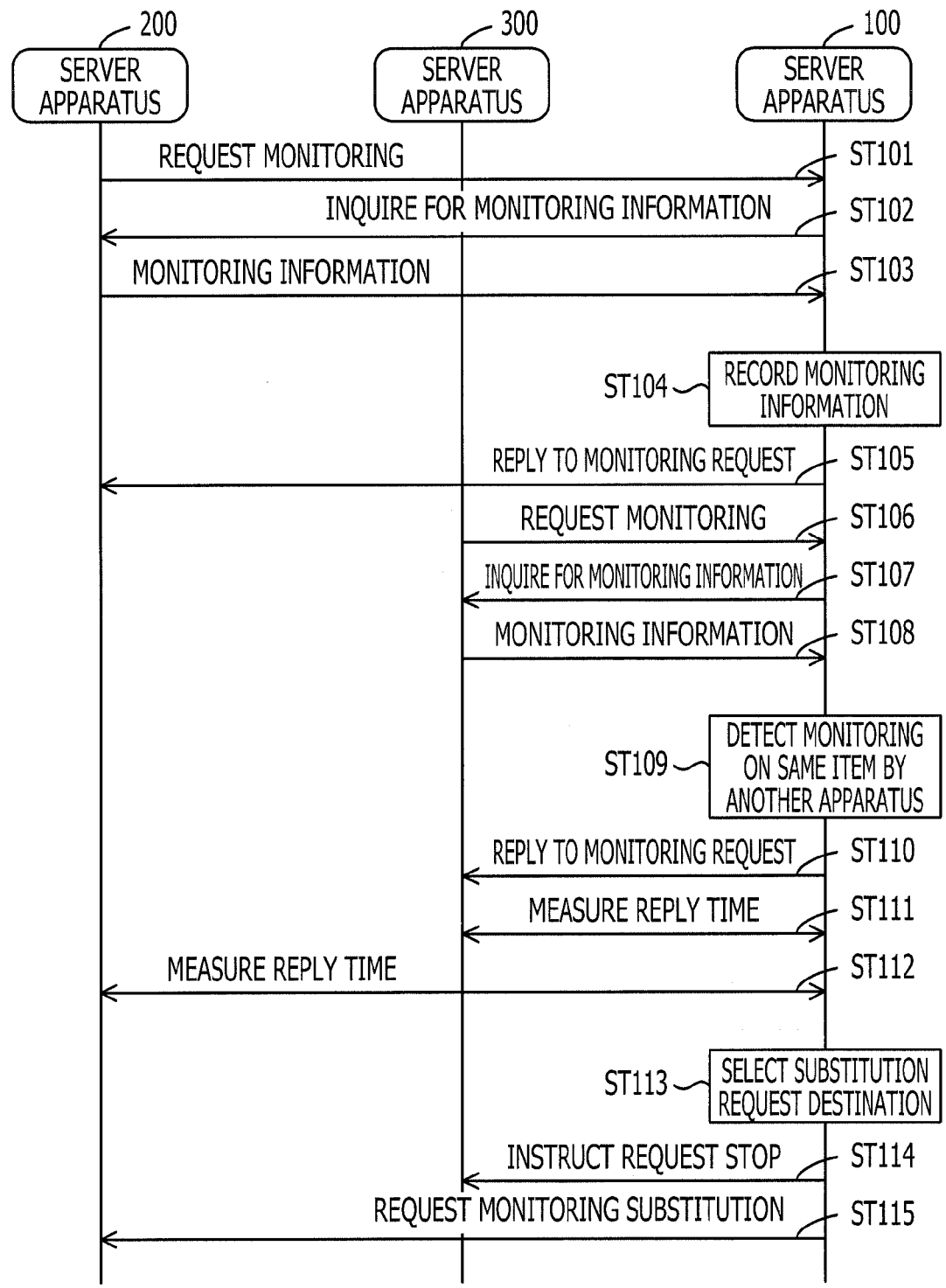
FIG. 8 is a sequence diagram of a process for a monitoring substitution request.

FIG. 8 is a sequence diagram of a process for a monitoring substitution request. Hereinafter, a description will be given of the process illustrated in FIG. 8. It is noted that immediately before ST101, it is supposed that any of the monitoring source apparatuses is not set in the access recording table 111 (which corresponds to a state in which the server apparatus 100 is not monitored). Immediately before ST101, it is supposed that the monitoring information of the server apparatus 200 is set in the access recording table 211, and the monitoring information of the server apparatus 300 is set in the access recording table 311.

(In ST101) The server apparatus 200 transmits the monitoring request to the server apparatus 100. The relevant monitoring request (for example, the ICMP echo request) is used for carrying out the alive monitoring on the communication function. The server apparatus 100 receives the relevant monitoring request.

(In ST102) The server apparatus 100 checks, on the basis of the content of the monitoring request, whether or not the access ID (IP address) of the server apparatus 200 that has transmitted the relevant monitoring request and the requested monitored item are already set in the access recording table 111 in a state of being associated with each other. The server apparatus 100 determines that the above-mentioned IP address and the monitored item are not set yet in the access recording table 111. Then, the server apparatus 100 inquires the server apparatus 200 for the monitoring information.

(In ST103) The server apparatus 200 transmits the monitoring information to the server apparatus 100 in response to the inquiry. The server apparatus 100 receives the relevant monitoring information.

(In ST104) The server apparatus 100 records the monitoring information of the server apparatus 200 in the access recording table 111.

(In ST105) The server apparatus 100 replies (for example, the ICMP echo reply) to the monitoring request received in ST101. The server apparatus 200 receives the reply. The server apparatus 200 refers to the access recording table 211 and determines whether or not the monitoring result is abnormal on the basis of the notification condition of itself with regard to the relevant monitored item. The server apparatus 200 executes the predetermined abnormality-time process in a case where the abnormality is detected.

(In ST106) The server apparatus 300 transmits the monitoring request to the server apparatus 100. The relevant monitoring request (for example, the ICMP echo request) is used for carrying out the alive monitoring on the communication function. The server apparatus 100 receives the relevant monitoring request.

(In ST107) The server apparatus 100 checks, on the basis of the content of the monitoring request, whether or not the access ID (IP address) of the server apparatus 300 that has transmitted the relevant monitoring request and the requested monitored item are already set in the access recording table 111 in a state of being associated with each other. The server apparatus 100 determines that the above-mentioned IP address and the monitored item are not set yet in the access recording table 111. Then, the server apparatus 100 inquires the server apparatus 300 for the monitoring information.

(In ST108) The server apparatus 300 transmits the monitoring information to the server apparatus 100 in response to the inquiry. The server apparatus 100 receives the relevant monitoring information.

(In ST109) The server apparatus 100 refers to the access recording table 111 and checks whether or not the same item as the monitored item (alive monitoring on the communication function) that is specified in the monitoring request received from the server apparatus 300 is monitored by another monitoring source apparatus. The server apparatus 100 detects that the same item is also monitored by the server apparatus 200.

(In ST110) The server apparatus 100 replies (for example, the ICMP echo reply) to the monitoring request received in ST106. The server apparatus 300 receives the reply. The server apparatus 300 refers to the access recording table 311 and determines whether or not the monitoring result is abnormal on the basis of the notification condition of itself with regard to the relevant monitored item. The server apparatus 300 executes the predetermined abnormality-time process in a case where the abnormality is detected.

(In ST111) The server apparatus 100 measures the reply time of the server apparatus 300. For example, the server apparatus 100 executes the ping command with respect to the server apparatus 300 and transmits the ICMP echo request. The server apparatus 100 receives the ICMP echo reply from the server apparatus 300. The server apparatus 100 counts a time from the echo request until the echo reply to measure a reply time.

(In ST112) The server apparatus 100 measures the reply time of the server apparatus 200. A specific example of the measuring method is similar to ST111.

(In ST113) The server apparatus 100 selects a monitoring source apparatus as the substitution request destination on the basis of the measuring results in ST111 and ST112. To be specific, the server apparatus having the shorter reply time is selected as the substitution request destination. At this time, it is supposed that the reply time of the server apparatus 200 is shorter than the reply time of the server apparatus 300. The server apparatus 100 selects the server apparatus 200 as the substitution request destination.

(In ST114) The server apparatus 100 instructs the server apparatus 300 to stop the monitoring request with regard to the item related to the monitoring request received in ST106. Upon receiving this instruction, the server apparatus 300 stops the transmission of the monitoring request to the server apparatus 100 with regard to the relevant item.

(In ST115) The server apparatus 100 transmits the monitoring information received in ST108 to the server apparatus 200 to request for the monitoring substitution. The server apparatus 200 receives the monitoring information and records the received monitoring information in the access recording table 211. With this configuration, the monitoring information of the server apparatus 300 is set in the access recording table 211.

In this manner, the server apparatus 100 requests the server apparatus 200 to substitute the monitoring for the server apparatus 300. At this time, since the server apparatus having the shorter reply time is selected as the substitution request destination, it is possible to shorten the process time for the monitoring in the information processing system.

It is noted that ST111 and ST112 may be executed in a reversed order or executed in parallel. ST114 and ST115 may be executed in a reversed order or executed in parallel.

In ST111 and ST112, an index other than the reply time may be obtained from the monitoring source apparatuses. In ST113, the substitution request destination may be selected on the basis of an index other than the reply time. For example, for the index other than the reply time, information indicating loads (for example, the utilization ratio of the CPU, the utilization ratio of the RAM, or the like) on the server apparatuses 200 and 300 may be obtained. For example, when the server apparatus having the lower load is selected as the substitution request destination, the loads on the server apparatuses 200 and 300 may be dispersed.

In addition, in ST111 to ST115, the reply time of the server apparatus 300 may be shorter than the reply time of the server apparatus 200. In that case, the process takes the following flow. The server apparatus 100 selects the server apparatus 300 as the substitution request destination. The server apparatus 100 instructs the server apparatus 200 to stop the monitoring request with regard to the relevant monitored item. The server apparatus 100 inquires the server apparatus 200 for the monitoring information with regard to the monitored item related to the monitoring request received in ST106. At this time, if the server apparatus 200 substitutes monitoring for another monitoring source apparatus other than itself, the monitoring information on the other monitoring source apparatus is also transmitted to the server apparatus 100. The server apparatus 100 transmits the monitoring information (the monitoring substitution request) obtained from the server apparatus 200 to the server apparatus 300. The server apparatus 300 records the relevant monitoring information in the access recording table 311.

Furthermore, in ST108, the server apparatus 100 may record the monitoring information received from the server apparatus 300 in the access recording table 111. In this way, in a case where the inquiry for the monitoring information is carried out, when all pieces of received monitoring information is recorded in the access recording table 111, it is possible to manage on the server apparatus 100 side which monitoring source apparatus substitutes monitoring for which of the other monitoring source apparatuses. Therefore, in a case where a monitoring source apparatus that is different from the monitoring source apparatus currently performing the monitoring substitution is set as the substitution request destination, the server apparatus 100 refers to the access recording table 111 and obtains the monitoring information so that the monitoring substitution request may be carried out. Thus, the process of inquiring the monitoring source apparatus currently performing the monitoring substitution for the monitoring information may be omitted, and it is possible to simplify the procedure.

After the process in ST115 described above, the server apparatus 200 substitutes the monitoring for the server apparatus 300. To be specific, the server apparatus 200 refers to the access recording table 211 and transmits the monitoring request of the corresponding item to the server apparatus 100 when the monitoring condition of itself is established or the monitoring condition of the server apparatus 300 is established. Next, the flow will be described.

Figure 9:
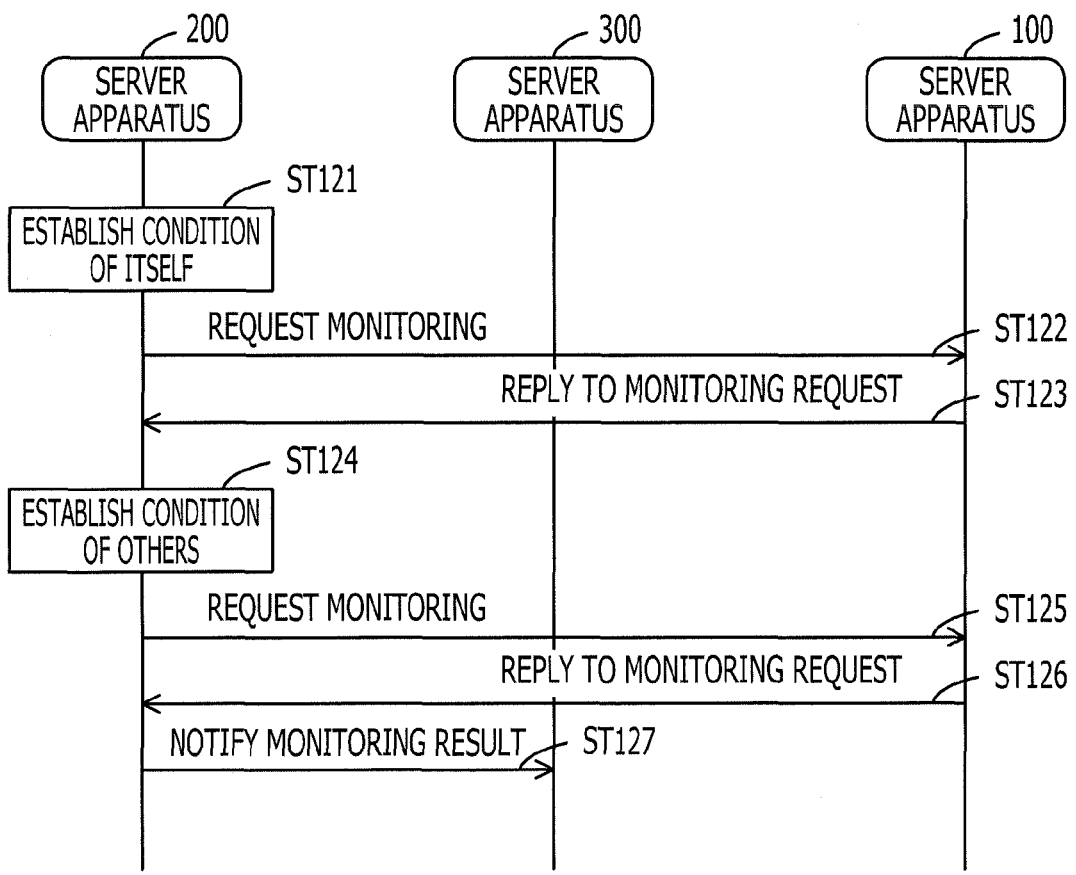
FIG. 9 is a sequence diagram of a process for a monitoring substitution.

FIG. 9 is a sequence diagram of a process for a monitoring substitution. Hereinafter, a description will be given of the process illustrated in FIG. 9.

(In ST121) The server apparatus 200 refers to the access recording table 211 and detects that the monitoring condition corresponding to access ID of itself is established. At this time, it is supposed that the condition for carrying out the alive monitoring on the communication function is established.

(In ST122) The server apparatus 200 transmits the monitoring request (for example, the ICMP echo request) with regard to the relevant monitored item (alive monitoring on the communication function) to the server apparatus 100. The server apparatus 100 receives the relevant monitoring request.

(In ST123) The server apparatus 100 refers to the access recording table 111 and checks that the monitored item related to the relevant request is set while being associated with the access ID of the server apparatus 100. Then, the server apparatus 100 transmits the reply (for example, the ICMP echo reply) to the monitoring request received in ST122 to the server apparatus 200. The server apparatus 200 receives the reply. The server apparatus 200 refers to the access recording table 211 and determines whether or not the monitoring result is abnormal on the basis of the notification condition with regard to the relevant monitored item of itself. The server apparatus 200 executes the predetermined abnormality-time process in a case where the abnormality is detected.

(In ST124) The server apparatus 200 refers to the access recording table 211 and detects that the monitoring condition corresponding to the access ID of the server apparatus 300 is established. At this time, it is supposed that the condition for carrying out the alive monitoring on the communication function is established.

(In ST125) The server apparatus 200 transmits the monitoring request (for example, the ICMP echo request) with regard to the relevant monitored item (alive monitoring on the communication function) to the server apparatus 100. The server apparatus 100 receives the relevant monitoring request.

(In ST126) The server apparatus 100 refers to the access recording table 111 and checks that the monitored item related to the relevant request is set while being associated with the access ID of the server apparatus 100. Then, the server apparatus 100 transmits the reply (for example, the ICMP echo reply) to the monitoring request received in ST125 to the server apparatus 200. The server apparatus 200 receives the reply.

(In ST127) The server apparatus 200 refers to the access recording table 211 and determines whether or not the monitoring result is abnormal on the basis of the notification condition of the server apparatus 300 with regard to the relevant monitored item. It is supposed that the server apparatus 200 detects an abnormality on the basis of the notification condition of the server apparatus 300. Then, the server apparatus 200 notifies the server apparatus 300 of the monitoring result. The server apparatus 300 determines that the relevant monitoring result is abnormal and executes the predetermined abnormality-time process.

In this manner, the server apparatus 200 substitutes the monitoring for the server apparatus 300.

Here, in ST121, a case may occur in which the monitoring condition of the server apparatus 200 itself is established, and at the same time, the monitoring condition of the server apparatus 300 is also established. In that case, in ST123, the server apparatus 200 also performs the abnormality detection based on the notification condition of the server apparatus 300. When an abnormality is detected on the basis of the notification condition of the server apparatus 300, the server apparatus 200 notifies the server apparatus 300 of the monitoring result. Similarly, in ST124, a case may occur in which the monitoring condition of the server apparatus 300 is established, and at the same time, the monitoring condition of the server apparatus 200 itself is established. In that case, in ST127, the server apparatus 200 also performs the abnormality detection based on the notification condition of itself. When an abnormality is detected on the basis of the notification condition of itself, the server apparatus 200 executes the predetermined abnormality-time process.

It is noted that in ST127, the server apparatus 300 is notified of the monitoring result when the server apparatus 200 determines that the abnormality exists on the basis of the notification condition of the server apparatus 300. On the other hand, the server apparatus 300 may be notified of the monitoring result also when the abnormality is not detected on the basis of the notification condition.

Alternatively, when the server apparatus 200 determines that the abnormality exists on the basis of the notification condition of itself, even when the abnormality is not detected on the basis of the notification condition of the server apparatus 300, the server apparatus 300 may be notified of the monitoring result. Also, when the server apparatus 200 determines that the abnormality occurs on the basis of the notification condition of itself, even when the monitoring condition of the server apparatus 300 is not established, the server apparatus 300 may be notified of the monitoring result.

The server apparatus 200 may adjust the monitoring schedule so that the monitoring is more efficiently carried out. Next, a specific example thereof will be described.

Figure 10:
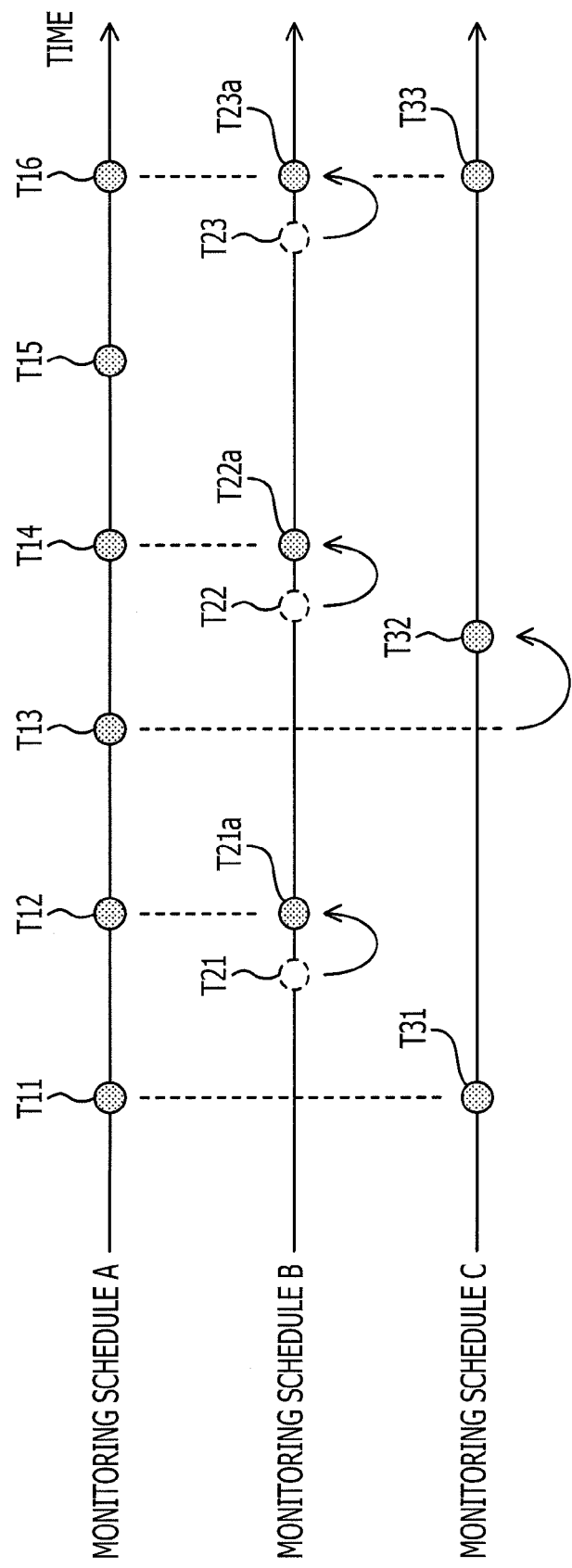
FIG. 10 illustrates an adjustment example of a schedule.

FIG. 10 illustrates an adjustment example of a schedule. A monitoring schedule A is a monitoring schedule based on the monitoring condition of the server apparatus 200 itself. A monitoring schedule B is a first example of a monitoring schedule based on the monitoring condition of the server apparatus 300. A monitoring schedule C is a second example of the monitoring schedule based on the monitoring condition of the server apparatus 300.

First, an adjustment example of the monitoring schedule B with respect to the monitoring schedule A will be described.

The monitoring schedule A indicates that the alive monitoring on the communication function by the server apparatus 100 is carried out at timings T11, T12, T13, T14, T15, and T16. Cycles of the respective timings are, for example, 10 msec.

The monitoring schedule B indicates that the alive monitoring on the communication function by the server apparatus 100 is carried out at timings T21, T22, and T23. Cycles of the respective timings are, for example, 20 msec.

When the monitoring execution unit 230 receives the substitution request of the monitoring from the monitoring control unit 120, the monitoring schedule B is newly generated to carry out the monitoring. Then, the monitoring execution unit 230 transmits the monitoring request to the monitoring control unit 120 at the respective timings of T11 to T16 and T21 to T23. However, when the monitoring request is transmitted at these respective timings, an influence may be imposed on the loads on the server apparatus 100 and the network.

In view of the above, the monitoring execution unit 230 aggregates the monitoring schedule B to the monitoring schedule A. To be specific, the timings T21, T22, and T23 are shifted to timings T21a, T22a, and T23a, and the alive monitoring is carried out once at each of the timings T12, T14, and T16. In a case where a reply to the monitoring request transmitted at the timings T12, T14, and T16 is received, the monitoring execution unit 230 detects an abnormality under the notification conditions of both itself and the server apparatus 300.

In this way, when the abnormality detection is carried out on the basis of the notification conditions for the plural monitoring source apparatuses with the monitoring result with respect to one monitoring request, the number of the monitoring requests concentrating on the server apparatus 100 and the packet amount of the monitoring requests flowing through the network may be reduced. Thus, the loads on the server apparatus 100 and the network may be further reduced, and the efficiency in the monitoring may be realized.

Next, a description will be given of an adjustment example of the monitoring schedule C with respect to the monitoring schedule A.

The monitoring schedule C indicates that the alive monitoring on the communication function by the server apparatus 100 is carried out at timings T31, T32, and T33. Cycles of the respective timings are, for example, 25 msec. Herein, the timings T31 and T33 are in synchronism with the timings T11 and T16. Thus, similarly as in the monitoring schedule B, the timings T31 and T33 may be aggregated to the monitoring schedule A. However, the timing T32 is not in synchronism with any of the timings in the monitoring schedule A. In view of the above, with regard to the timing T32, the monitoring execution unit 230 manages the schedule as a difference from the timing T13 which is immediately before the timing T32 in the monitoring schedule A. For example, the timing T32 is managed as being 5 msec after the timing T13. In this way, a part of the monitoring schedule C is aggregated to the monitoring schedule A, and the other part is managed as the difference from the monitoring schedule A, so that the loads on the server apparatus 100 and the network may be reduced. In addition, the monitoring execution unit 230 appropriately covers the respective monitoring timings included in the monitoring schedule C to perform the monitoring substitution.

When the monitoring schedules are aggregated, the server apparatus 200 may avoid managing the plural monitoring schedules. Thus, it is also possible to alleviate the load caused by the monitoring process of the server apparatus 200.

Figure 11A:
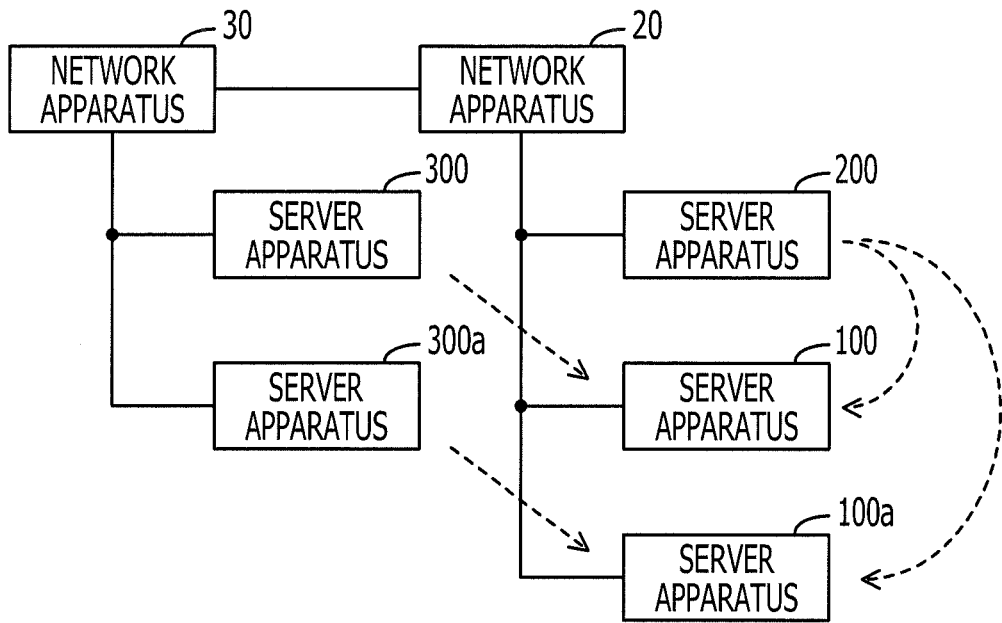
FIG. 11A and FIG. 11B illustrate monitoring process examples.
Figure 11B:
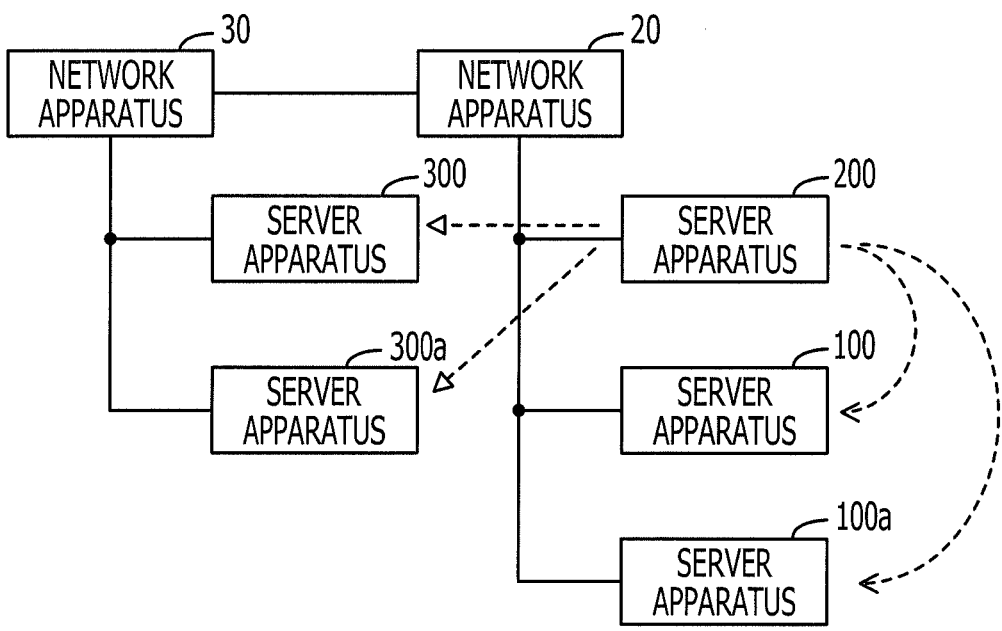

FIG. 11A and FIG. 11B illustrate monitoring process examples. The information processing system according to the second embodiment includes the server apparatuses 100, 200, and 300 but may further include a large number of server apparatuses. For example, a server apparatus 100a is included as the monitoring destination apparatus, and a server apparatus 300a is included as the monitoring source apparatus. The server apparatus 100a is realized by a configuration similar to the server apparatus 100. The server apparatus 300a is realized by a configuration similar to the server apparatus 300. The server apparatuses 300 and 300a are connected to the server apparatuses 100, 100a, and 200 via network apparatuses 30 and 20 arranged in the network 10.

The server apparatuses 200, 300, and 300a perform the alive monitoring on the communication function of the server apparatuses 100 and 100a. At this time, the server apparatus 200 substitutes the monitoring for the server apparatuses 300 and 300a in the following manner. FIG. 11A illustrates the information processing system before the server apparatus 200 performs the monitoring substitution.

In FIG. 11A, the server apparatus 100 selects one of the server apparatuses 200 and 300 functioning as the monitoring source apparatuses which has a shorter reply time for the communication and requests the selected server apparatus to perform the monitoring substitution of the communication function. Herein, the server apparatuses 300 and 300a are connected to the server apparatus 100 via the network apparatuses 30 and 20. For this reason, with regard to the reply time with respect to the server apparatuses 100 and 100a, it is likely that the server apparatuses 300 and 300a have a longer reply time than the server apparatus 200. When it is determined that the server apparatus 200 has a shorter reply time than the server apparatus 300, the server apparatus 100 requests the server apparatus 200 for the substitution of the monitoring for the server apparatus 300. When it is determined that the server apparatus 200 has a shorter reply time than the server apparatus 300a, the server apparatus 100a requests the server apparatus 200 for the substitution of the monitoring for the server apparatus 300a.

FIG. 11B illustrates the information processing system at a time when the server apparatus 200 performs the monitoring substitution. The server apparatus 200 substitutes the monitoring for the server apparatuses 300 and 300a. In that case, the server apparatus 200 monitors the server apparatus 100 under the monitoring condition of the server apparatus 300. When the result is abnormal according to the notification condition of the server apparatus 300, the server apparatus 300 is notified of the monitoring result. Similarly, the server apparatus 200 monitors the server apparatus 100a under the monitoring condition of the server apparatus 300a. When the result is abnormal according to the notification condition of the server apparatus 300a, the server apparatus 300a is notified of the monitoring result.

In this way, the server apparatus 200 may also substitute the monitoring for the plural monitoring source apparatuses.

According to the second embodiment as described above, the monitoring of the apparatuses included in the information processing system may be efficiently carried out.

To be specific, in a case where a plural monitoring source apparatuses that monitor the same item with respect to a certain monitoring destination apparatus exist, one monitoring source apparatus among those apparatuses is caused to substitute the monitoring for the other monitoring source apparatuses. For this reason, for example, in the monitoring destination apparatus, it suffices that a reply is made only to the one monitoring source apparatus. Also, while the monitoring destination apparatus instructs the monitoring source apparatuses other than the one monitoring source apparatus to stop the monitoring request with regard to the relevant item, the transmission of the excess monitoring request onto the network may be suppressed. For this reason, it is possible to alleviate the loads on the monitoring destination apparatus and the network.

The monitoring destination apparatus selects the substitution request destination among plural monitoring source apparatuses on the basis of indices indicating performances, capabilities, and the like of the respective monitoring source apparatuses. For this reason, it is possible to increase the speed of the process related to the monitoring in the information processing system.

The monitoring source apparatus that receives the substitution request adjusts the monitoring schedule on the basis of the monitoring condition of another monitoring source apparatus. To be specific, by aggregating the plural monitoring schedules, the transmission of the monitoring request to the monitoring destination apparatus is suppressed. For this reason, it is possible to further alleviate the loads on the monitoring source apparatus, the monitoring destination apparatus, and the network.

Third Embodiment

Next, a description will be given of a third embodiment. A difference from the above-mentioned second embodiment will be mainly described, and a description on a similar point will be omitted.

According to the second embodiment, the description has been given while the server apparatus 100 is set as the monitoring destination apparatus (monitored side), and the server apparatuses 200 and 300 are set as the monitoring source apparatuses (monitoring side). In contrast to this, a case is also conceivable in which the server apparatuses 100, 200, and 300 mutually perform the monitoring. That is, any of the server apparatuses 100, 200, and 300 may be both or one of the monitoring destination apparatus and the monitoring source apparatus. According to the third embodiment, the above-mentioned information processing system is supposed.

Herein, the entire configuration of the information processing system according to the third embodiment is the same as the entire configuration of the information processing system according to the second embodiment described in FIG. 2, and a description thereof will be omitted. A server apparatus included in the information processing system according to the third embodiment is assigned with the same reference symbol as the second embodiment for convenience, and a description will be given. Hardware examples of the server apparatuses 100, 200, and 300 according to the third embodiment is the same as the hardware example of the server apparatus 100 according to the second embodiment described in FIG. 3, and a description thereof will be omitted.

Figure 12:
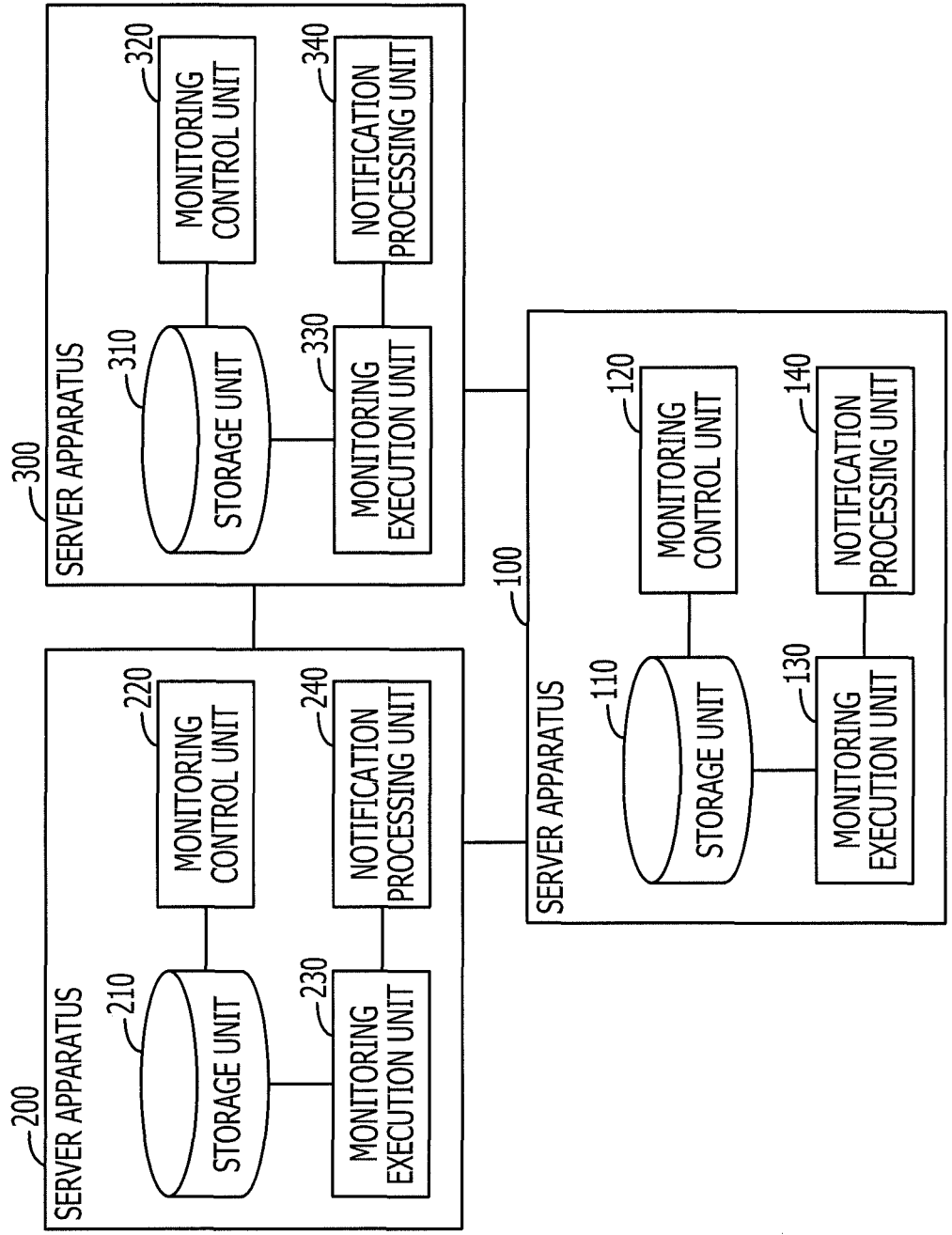
FIG. 12 is a block diagram illustrating functions of a server apparatus according to a third embodiment.

FIG. 12 is a block diagram illustrating functions of the server apparatus according to the third embodiment. The server apparatus 100 includes the storage unit 110, the monitoring control unit 120, a monitoring execution unit 130, and a notification processing unit 140.

Herein, the storage unit 110 and the monitoring control unit 120 are the same as the components with the same reference symbols and the names described in FIG. 4. The monitoring execution unit 130 has the same functions as the monitoring execution units 230 and 330 described in FIG. 4. The notification processing unit 140 has the same functions as the notification processing units 240 and 340 described in FIG. 4.

The server apparatus 200 includes the storage unit 210, a monitoring control unit 220, the monitoring execution unit 230, and the notification processing unit 240.

Herein, the storage unit 210, the monitoring execution unit 230, and the notification processing unit 240 are the same as the components with the same reference symbols and the names described in FIG. 4. The monitoring control unit 220 has the same functions as the monitoring control unit 120 described in FIG. 4.

The server apparatus 300 includes the storage unit 310, a monitoring control unit 320, the monitoring execution unit 330, and the notification processing unit 340.

Herein, the storage unit 310, the monitoring execution unit 330, and the notification processing unit 340 are the same as the components with the same reference symbols and the names described in FIG. 4. The monitoring control unit 320 has the same functions as the monitoring control unit 120 described in FIG. 4.

In this way, the server apparatuses 100, 200, and 300 are provided with the components performing both the functions of the monitoring destination apparatus and the monitoring source apparatus. With this configuration, the server apparatuses 100, 200, and 300 may monitor one another. In a case where the server apparatus 100 functions as the monitoring source apparatus, the monitoring of the monitoring destination apparatus is carried out through the process procedure illustrated in FIG. 7. In a case where the server apparatuses 200 and 300 function as the monitoring destination apparatuses, the substitution request of the monitoring is conducted to the monitoring source apparatus through the process procedure illustrated in FIG. 6.

With this configuration, also in the information processing system where the server apparatuses 100, 200, and 300 mutually perform the monitoring, an effect similar to that of the second embodiment may be obtained. That is, the monitoring of the apparatuses included in the information processing system may be efficiently carried out.

To be specific, in a case where plural monitoring sources that monitor the same item of the same monitoring destination apparatus exist, one of the monitoring source apparatuses is caused to substitute the monitoring for the other monitoring source apparatuses. Also, the monitoring destination apparatus instructs the monitoring source apparatuses other than the one monitoring source apparatus to stop the monitoring request with regard to the relevant item. With this configuration, the concentration of the monitoring requests onto the monitoring destination apparatus is suppressed, and the load on the monitoring destination apparatus may be alleviated. In addition, the transmission of the excess monitoring request onto the network may be suppressed, and it is possible to alleviate the load on the network.

In the information processing system according to the third embodiment, any of the server apparatuses 100, 200, and 300 may be the monitoring source apparatus. For this reason, the number of transmissions of the monitoring requests may be excessive. Therefore, an advantage in which the transmission of the excess monitoring request is suppressed to alleviate the loads on the monitoring destination apparatus and the network is particularly useful.

The monitoring destination apparatus selects the substitution request destination among plural monitoring source apparatuses on the basis of indices indicating performances, capabilities, and the like of the respective monitoring source apparatuses. For this reason, the speed of the process related to the monitoring in the information processing system may be increased.

The monitoring source apparatus that receives the substitution request adjusts the monitoring schedule on the basis of the monitoring condition of another monitoring source apparatus. To be specific, the plural monitoring schedules are aggregated, and the transmission of the monitoring request to the monitoring destination apparatus is suppressed. For this reason, it is possible to further alleviate the loads on the monitoring source apparatus, the monitoring destination apparatus, and the network.

It is noted that the functions of the components of the server apparatuses 100, 200, and 300 according to the third embodiment are realized on the respective server apparatuses, for example, while the CPUs provided to the respective server apparatuses execute the predetermined programs as described according to the second embodiment. The functions of the components of the respective server apparatuses may also be realized by dedicated hardware.

According to the second and third embodiments, the case has been exemplified in which the server apparatuses function as the monitoring destination apparatus and the monitoring source apparatus, but the apparatuses are not limited to the server apparatuses. For example, a network apparatus may be set as the monitoring source apparatus. To be more specific, for example, a load balancer configured to perform the alive monitoring of the server apparatus and disperse process requests may be set as the monitoring source apparatus. In addition, a network apparatus, a library apparatus configured to manage plural recording media, an external storage apparatus that store data of the server apparatus, a personal computer, or the like may be set as the monitoring destination apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing a program that causes a computer to execute a procedure comprising:
   receiving a message for monitoring an item of the computer from a first information processing apparatus;
   inquiring the first information processing apparatus for a first condition for monitoring the item;
   determining a second information processing apparatus by referring to monitoring information stored in a storage, the monitoring information including information indicating the item and a second condition in association with an identifier for identifying the second information processing apparatus monitoring the item under the second condition;
   instructing one of the first and second information processing apparatuses to monitor the item under the first condition and also under the second condition; and
   instructing the other one of the first and second information processing apparatuses not to transmit a message for monitoring the item.

2. The non-transitory computer-readable recording medium according to claim 1, wherein
   the computer selects the one of the first and second information processing apparatuses, based on a given index regarding the first and second information processing apparatuses.

3. The non-transitory computer-readable recording medium according to claim 2, wherein
   the given index is a response speed of communication with each of the first and second information processing apparatuses.

4. The non-transitory computer-readable recording medium according to claim 1, the procedure further comprising:
   transmitting an identifier for identifying the other one of the first and second information processing apparatuses to the one of the first and second information processing apparatuses.

5. A non-transitory computer-readable recording medium storing a program that causes a computer to execute a procedure comprising:
   monitoring an item of a first information processing apparatus under a first condition;
   receiving, from the first information processing apparatus, information related to a monitoring substitution request which indicates a second condition for monitoring the item and an identifier for identifying a second information processing apparatus;
   storing the received information in a storage;

monitoring the item under the second condition; and transmitting, based on the identifier, a result of monitoring the under the second condition to the second information processing apparatus.

6. The computer-readable recording medium according to claim 5, the procedure further comprising:

determining a schedule for monitoring the item, based on the first condition and the second condition.

7. The non-transitory computer-readable recording medium according to claim 6, wherein the first condition specifies a first period of monitoring cycles, the second condition specifies a second period of monitoring cycles, and the computer determines the schedule so as to match first monitoring timings based on the first period with second monitoring timings based on the second period.

8. The non-transitory computer-readable recording medium according to claim 5, the procedure further comprising:

receiving information indicating a notification condition in accordance with which the second information processing apparatus determines that a result of monitoring is abnormal;

storing the information indicating the notification condition in the storage; and determining whether a result of monitoring is abnormal in accordance with the information indicating the notification condition stored in the storage, wherein the computer transmits the result of monitoring when the computer determines that the result of monitoring is abnormal.

9. An information processing apparatus comprising:

a storage; and a processor configured to receive a message for monitoring an item of the information processing apparatus from a first monitoring apparatus, inquire the first monitoring apparatus for a first condition for monitoring the item, determine a second monitoring apparatus by referring to monitoring information stored in the storage, the monitoring information including information indicating the item and a second condition in association with an identifier for identifying the second monitoring apparatus monitoring the item under the second condition, instruct one of the first and second monitoring apparatuses to monitor the item under the first condition and also under the second condition, and instruct the other one of the first and second monitoring apparatuses not to transmit a message for monitoring the item.

10. An information processing apparatus comprising:

a storage; and a processor configured to monitor an item of a first information processing apparatus under a first condition, receive, from the first information processing apparatus, information related to a monitoring substitution request which indicates a second condition for monitoring the item and identifier for identifying a second information processing apparatus, store the received information in the storage, monitor the item in under the second condition, and transmit, based on the identifier, a result of monitoring the item under the second condition to the second information processing apparatus.

* * * * *

UNITED STATES PATENT AND TRADEMARK OFFICE
CERTIFICATE OF CORRECTION

PATENT NO. : 9,075,888 B2
APPLICATION NO. : 13/489727
DATED : July 7, 2015
INVENTOR(S) : Taketoshi Yoshida It is certified that error appears in the above-identified patent and that said Letters Patent is hereby corrected as shown below:

In the Claims

Claim 5, Column 23, Line 3

Delete "the under" and insert --the item under--, therefor.

Claim 6, Column 23, Line 5

After "the" insert --non-transitory--.

Claim 10, Column 24, Line 30

After "item" delete "in".

Signed and Sealed this
Thirteenth Day of October, 2015

Michelle K. Lee
*Director of the United States Patent and Trademark Office*